United States Patent

Fontana et al.

Patent Number: 5,358,787
Date of Patent: Oct. 25, 1994

[54] RF ABSORPTIVE WINDOW

[75] Inventors: Thomas P. Fontana, White Bear Lake; Peter A. Bellus, Eden Prairie, both of Minn.

[73] Assignee: Westinghouse Electric Corporation, Pittsburgh, Pa.

[21] Appl. No.: 998,220

[22] Filed: Dec. 30, 1992

[51] Int. Cl.$^5$ ............................................. B32B 7/00
[52] U.S. Cl. ..................................... 428/432; 428/412; 428/433; 428/434; 428/469; 428/471; 428/472; 428/689; 428/697; 428/701; 428/702; 359/359; 359/360
[58] Field of Search ............... 428/426, 432, 412, 689, 428/697, 702, 469, 472, 471, 701, 446, 433, 434; 359/359, 360

[56] References Cited

U.S. PATENT DOCUMENTS

| | | | |
|---|---|---|---|
| 4,065,600 | 12/1977 | King | 428/432 |
| 4,568,578 | 2/1986 | Arfsten | 428/432 |
| 4,786,783 | 11/1988 | Woodard | 219/547 |
| 5,073,451 | 12/1991 | Iida | 428/432 |
| 5,147,694 | 9/1992 | Clarke | 428/432 |

OTHER PUBLICATIONS

Emerson, W. H. "Electromagnetic Wave Absorbers and Anechoic Chambers through the Years", IEEE Transactions on Antennas and Propagation, vol. AP-21, No. 4, Jul. 1973, pp. 484–490.

Nortier, J. R. et al. "Tables for the Designs of Jaumann Microwave Absorber", Microwave Journal, Sep. 1987, pp. 219–222.

Ruck, G. T. et al. "The Radar Cross Section Handbook", Plenum Press, New York, 1970, Library of Congress Catalog Card Number 88-26774.

Primary Examiner—Ellis P. Robinson
Assistant Examiner—Timothy M. Speer

[57] ABSTRACT

A window which is transparent to visible light and/or infrared radiation but which absorbs radio frequency energy. The window has a at least two layers of dielectric material separated by a conductor and backed with another conductor. Each layer of the window is selected to be transparent to visible light and/or infrared radiation. The window functions to absorb RF energy in a manner similar to a Jaumann absorber, with the exception that the backing conductor need not be a short circuit. The window is constructed of known window materials, such as glass and plastic, with the conductors being a gold film or indium-tin oxide.

12 Claims, 5 Drawing Sheets

RF ABSORPTIVE WINDOW

BACKGROUND OF THE INVENTION

Prior art window materials, such as glass and plastic, have high transmissivity for electromagnetic energy of a wide range of frequencies, including visible light, IR and RF energy. In some applications, for example stealthy military aircraft, a window's ability to pass radio frequency energy is a disadvantage. Not only do traditional materials fail to absorb RF energy, but they also permit reflections from behind the window to pass back through the window.

This issue has been addressed in some applications by placing a metal screen behind the window, thereby making it reflective of RF energy. The screen reflects the RF energy while allowing visible or IR energy to pass. By careful shaping of the reflective screen it is at least possible to direct the reflected RF energy in a desired direction; e.g. away from a hostile radar installation. Disadvantages of this approach include the attenuation of the visible and IR energy passing through the window/screen, and the optical distortion which can be caused by the screen material. Alternatively, a thin gold film may be applied to the window to make it reflective of RF energy while still transparent to visible/IR energy. This approach is a partial solution at best. A preferred approach would be to have a window which absorbs RF radiation while transmitting visible light and/or infrared radiation without significant distortion.

Electromagnetic wave absorbers have been the subject of years of research and development, as chronicled in "Electromagnetic Wave Absorbers and Anechoic Chambers Through the Years" by William H. Emerson, published in *IEEE Transactions on Antennas and Propagation*, Volume AP-21, No. 4, July 1973, pages 484–490. One well known type of RF energy absorber, known as the Jaumann absorber, consists of resistive sheets separated by low loss foam spacers placed in front of a conductor of infinite conductivity, as described more fully in "Tables for the Design of Jaumann Microwave Absorber" by J. R. Nortier, et al., published in *Microwave Journal*, September 1987, pages 219–222, incorporated by reference herein. Prior art electromagnetic wave absorbers are not useful in applications requiring windows, since the absorbers are opaque to visible and infrared energy.

SUMMARY OF THE INVENTION

In light of the performance limitations of the prior art, it is an object of this invention to provide a window which transmits visible or infrared radiation while absorbing radio frequency energy. Accordingly, an RF absorptive window is described which has a first layer of a conducting material having low resistivity, a second layer of a dielectric material, a third layer of a conducting material having resistivity higher than that of the first layer, and a fourth layer of a dielectric material. Each of the layers of the window is selected to be transparent to visible light and/or infrared radiation. The conductive layers may be a gold film or indium-tin oxide, and the dielectric material may be glass or plastic. An alternative embodiment of the invention has a fifth conductive layer and a sixth layer of dielectric material, with the fifth conductive layer having a resistivity higher than that of the first layer.

DETAILED DESCRIPTION OF THE INVENTION

Figure 1:
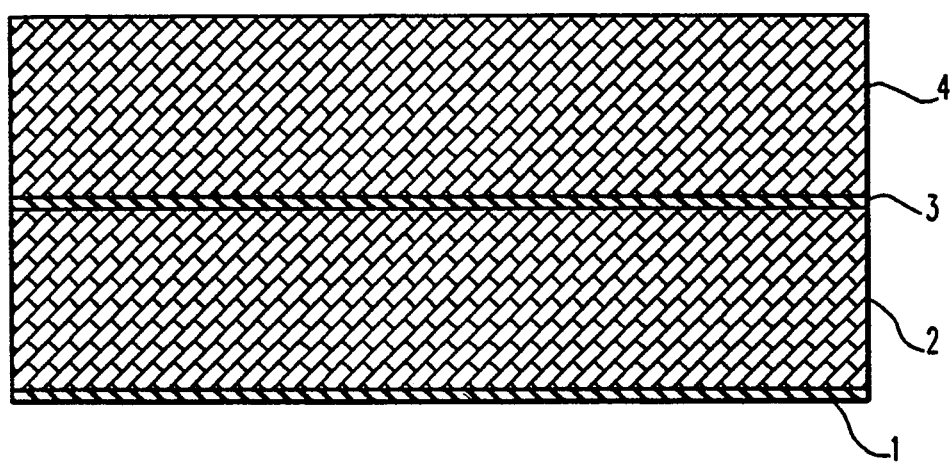
FIG. 1 illustrates one embodiment of an RF absorptive window in accordance with this invention.

An RF absorbing window can be constructed in a configuration which functions to absorb electromagnetic energy in a manner similar to a Jaumann absorber. FIG. 1 illustrates such a window having a first layer 1 and a third layer 3 which are conductive layers, and a second layer 2 and a fourth layer 4 which are dielectric layers. All four layers of this window are selected to be transparent to visible light and/or infrared irradiation. Unlike traditional Jaumann absorbers, where the bottom conductive layer is a short circuit (i.e. zero resistivity/infinite conductivity for microwave energy), layer 1 of the device of FIG. 1 can have low resistivity, for example, on the order of approximately 1–100 ohm/square. The resistivity of the third layer 3 is also low, but preferably higher than that of layer 1, for example in excess of 100 ohm/square. Dielectric layers 2 and 4 may be, for example, silica/glass or polymer/plastic, or a combination thereof, with thicknesses of typically less than 1 inch. The first conductive layer 1 may be a thin film of gold, which will provide a resistivity of about 15–20 ohm/square while remaining transparent to visible light. Such a gold film will, however, absorb infrared radiation. For applications which must be transparent to infrared radiation, layer 1 may be, for example, indium-tin oxide (ITO). Special transparent multi-layer metal coatings such as 1-Series produced by Flex Products, Inc. of Santa Rosa, Calif., or INTREX G produced by Courtaulds Performance Film, Inc. of Sylmar, Calif. may also be used as the conductive layer 1. Indium-tin oxide may also be used for layer 3.

Figure 2:
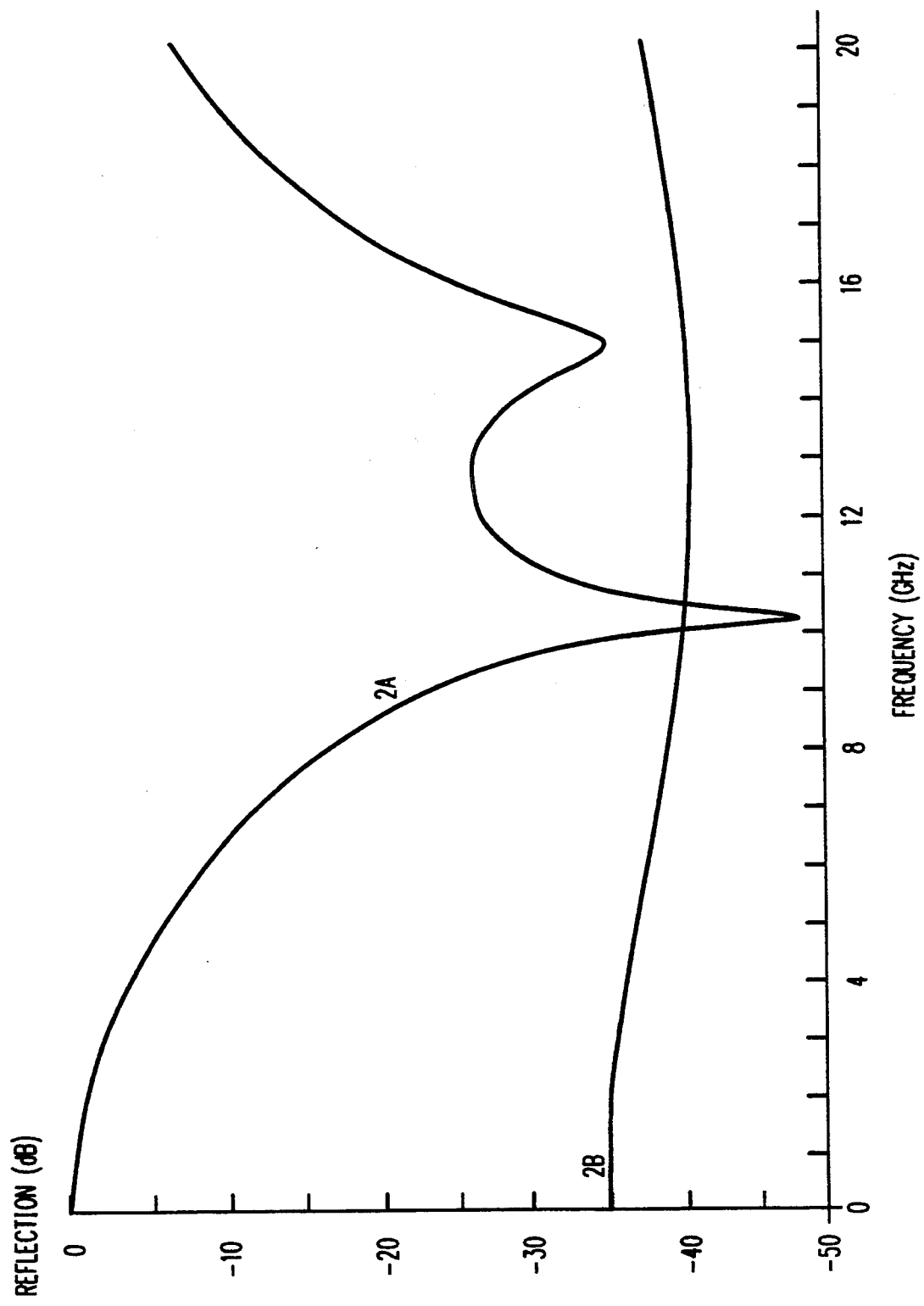
FIG. 2 shows the RF absorption characteristics of a window built in accordance with FIG. 1 where the window is designed to be transparent to visible light.

FIG. 2 illustrates the RF absorbing characteristics of a window constructed in accordance with FIG. 1 and having the following structure:

| Layer | Material | Thickness | Resistivity |
|---|---|---|---|
| 1 | gold | .005" | 16 ohms/sq. |
| 2 | clear acrylic | .125" | |
| 3 | ITO | .007" | 200 ohms/sq. |
| 4 | clear acrylic | .125" | |

Curve 2A of FIG. 2 is the strength of the signal reflected off of the window surface in relation to the strength of a normal incidence signal. Curve 2B is the strength of the signal passing through the window in relation to the strength of a normal incidence signal. The window provides this level of RF absorption while at the same time being approximately 60–65% transmissive to light in the visible energy range.

The specific window layer materials and thickness can be changed to optimize the performance of the window in response to varying design criteria. For example, in some applications specific frequencies will be of particular concern, or the optical properties may be more or less important. RF energy absorption can be predicted by known design equations, such as published in "The Radar Cross Section Handbook" by George T. Ruck, et al. published by Plenum Press, New York, 1970, Library of Congress Catalog Card Number 88-26774, incorporated herein by reference.

In an embodiment where it is desirable to permit the transmission of infrared energy, the device of FIG. 1 may be constructed with the following structure:

| Layer | Material | Thickness | Resistivity |
|-------|----------|-----------|-------------|
| 1 | ITO | | 100 ohms/sq. |
| 2 | Silica | .120" | |
| 3 | ITO | | 175 ohms/sq. |
| 4 | Silica | .120" | |

Figure 3:
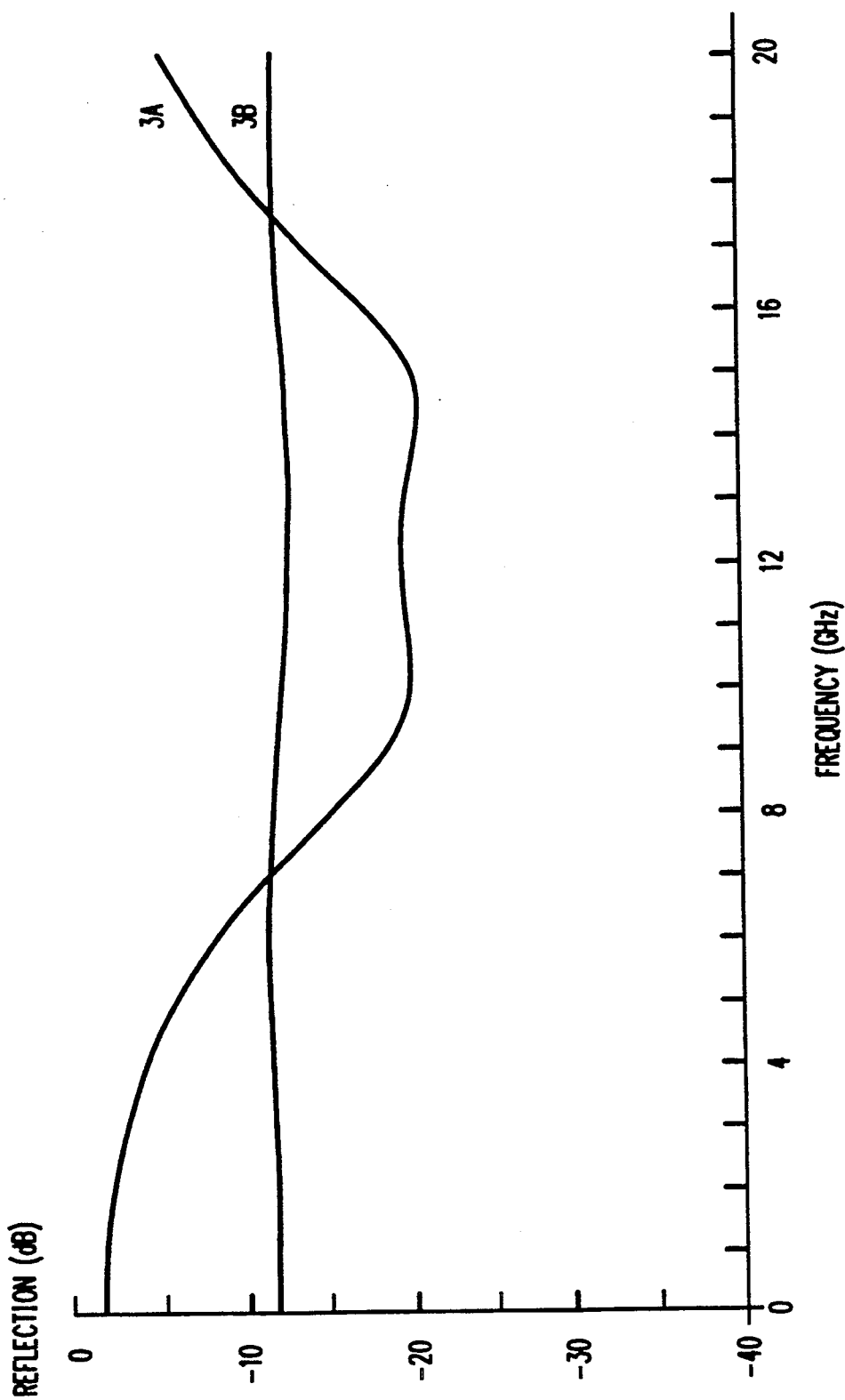
FIG. 3 shows the calculated RF absorption characteristics of a window built in accordance with FIG. 1 where the window is designed to be transparent to infra-red energy.

The performance of such a device is calculated to be as shown in FIG. 3, where Curve 3A is the strength of the reflected energy relative to a normal incidence signal, and Curve 3B is the strength of the transmitted signal relative to a normal incidence signal. Such a window would exhibit about 72% transmittance in the near infrared band.

Figure 4:
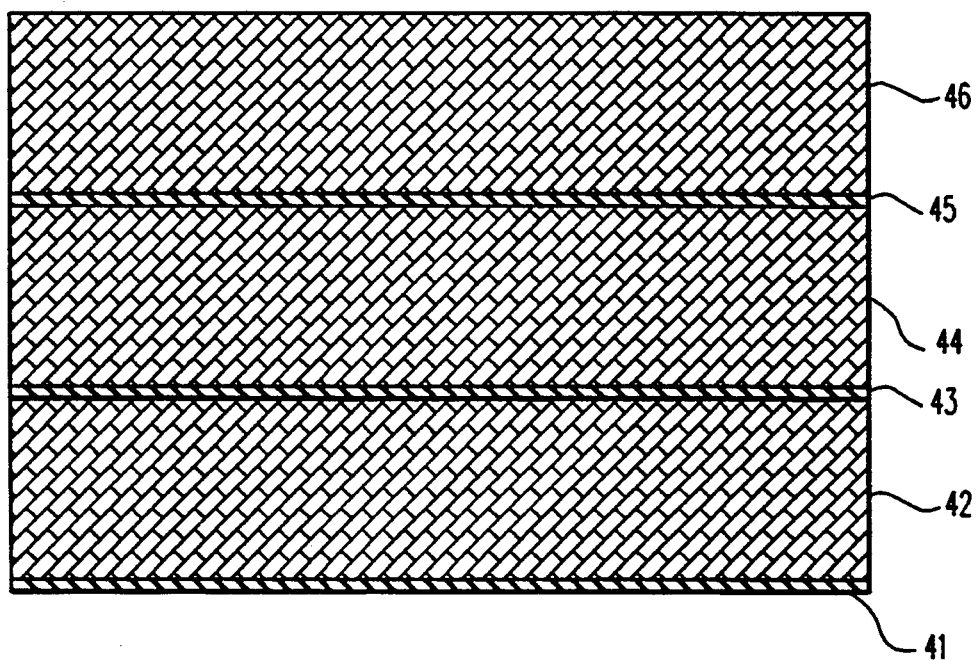
FIG. 4 illustrates a second embodiment of an RF absorptive window in accordance with this invention.

Improved RF absorption may be obtained by constructing a window as illustrated in FIG. 4, where a first layer 41, a third layer 43, and a fifth layer 45 are conductive layers, and a second layer 42, a fourth layer 44, and a sixth layer 46 are dielectric layers. In such an embodiment, the first layer 41 and the third layer 43 need not be infinitely conductive, but should have low resistivity, for example, approximately 1–100 ohms/square. The resistivity of the fifth layer 45 is also low, but may be well in excess of that of the first layer 41, for example over 100 ohms/square. Materials selected for such a window may be the same as those selected for the device of FIG. 1. One embodiment of a window as shown in FIG. 4 for an infrared transmissive application has the following structure:

| Layer | Material | Thickness | Resistivity |
|-------|----------|-----------|-------------|
| 1 | ITO | | 100 ohms/sq. |
| 2 | Silica | .175" | |
| 3 | ITO | | 100 ohms/sq. |
| 4 | Silica | .130" | |
| 5 | ITO | | 175 ohms/sq. |
| 6 | Silica | .125" | |

Figure 5:
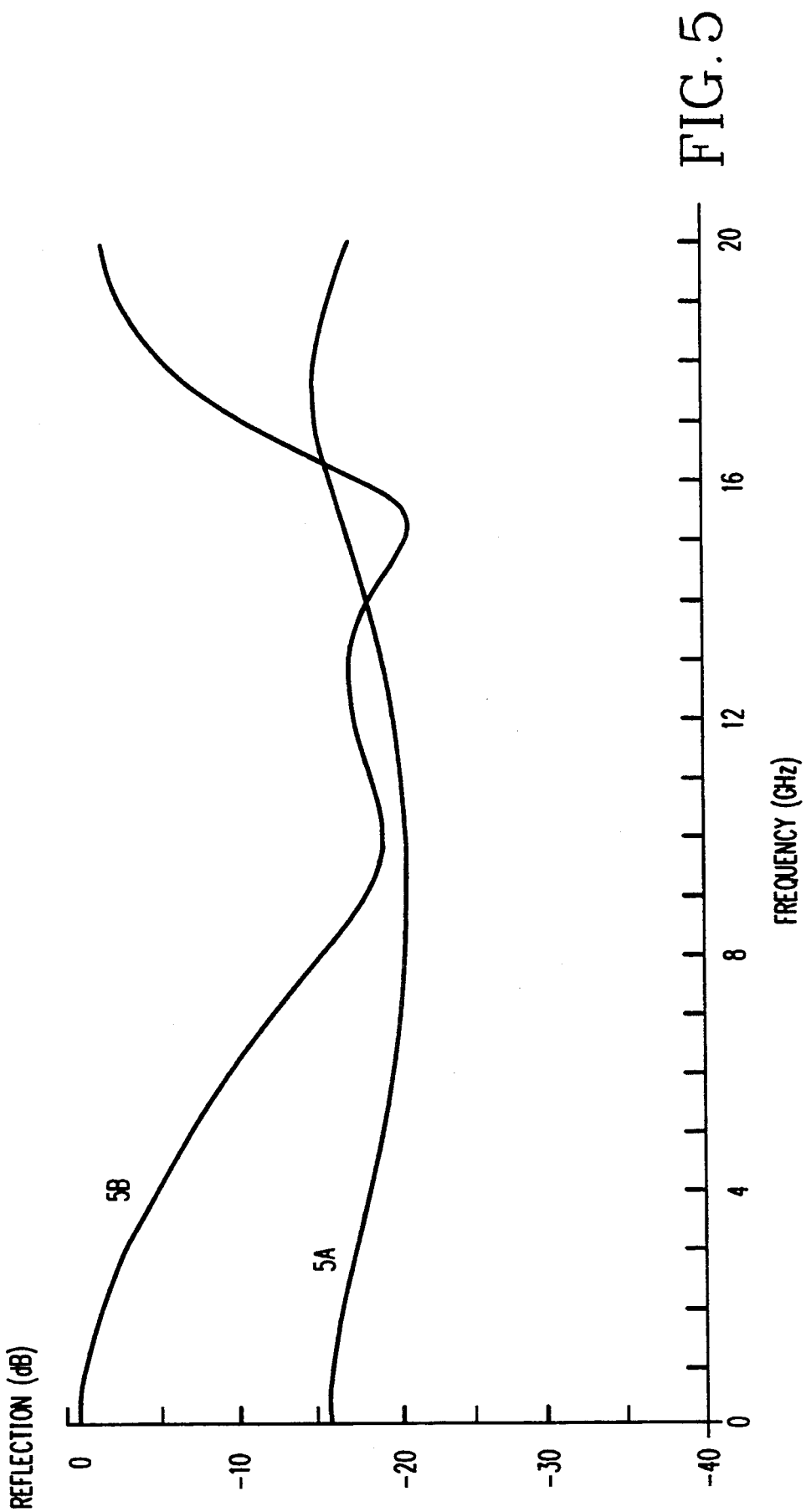
FIG. 5 shows the calculated RF absorption characteristics of a window built in accordance with FIG. 4 where the window is designed to be transparent to infra-red energy.

The performance of such a window is calculated to be as shown in FIG. 5, where Curve 5A is the strength of the reflected signal relative to a normal incidence signal, and Curve 5B is the strength of the transmitted signal relative to the strength of a normal incidence signal. A comparison of this performance with that shown in FIG. 3 shows that the extra layers of indium-tin oxide and glass provide an improvement in RF absorption, as evidenced by the reduced RF transmission, although little is gained in reduced reflection. The transmittance in the near IR band for this device would be approximately 60%.

The embodiments described above are provided as examples, and should not be interpreted to limit the scope of the invention as claimed below.

We claim:

1. A window which transmits visible or infrared radiation while absorbing radio frequency energy comprising:

a first layer comprising a conductor having a resistivity in the range of one ohm/square to 100 ohm/square;

a second layer disposed on said first layer and comprising a dielectric material;

a third layer disposed on said second layer and comprising a conductor having a resistivity greater than 100 ohm/square;

a fourth layer disposed on said third layer and comprising a dielectric material.

2. The device of claim 1, wherein each layer of said window is transparent to visible light.

3. The device of claim 1, wherein each layer of said window is transparent to infrared radiation.

4. The device of claim 1, wherein said first layer comprises gold.

5. The device of claim 1, wherein said first layer comprises indium-tin oxide.

6. The device of claim 1, wherein said second or said fourth layer comprises glass.

7. The device of claim 1, wherein said second or said fourth layer comprises plastic.

8. The device of claim 1, wherein said third layer comprises indium-tin oxide.

9. A window which transmits visible or infrared radiation while absorbing radio frequency energy comprising:

a first layer comprising a conductor having a resistivity in the range of one ohm/square to 100 ohms/square;

a second layer disposed on said first layer and comprising a dielectric material;

a third layer disposed on said second layer and comprising a conductor having low resistivity;

a fourth layer disposed on said third layer and comprising a dielectric material;

a fifth layer disposed on said fourth layer and comprising on a conductor having a resistivity greater than 100 ohm/square;

a sixth layer disposed on said fifth layer and comprising a dielectric material.

10. The device of claim 9, wherein each layer of said window is transparent to visible light.

11. The device of claim 9, wherein each layer of said window is transparent to infrared radiation.

12. The device of claim 9, wherein said first, third and fifth layers comprise indium-tin oxide, and said second, fourth and sixth layers comprise silica.

* * * * *